(12) United States Patent
Panine

(10) Patent No.: US 10,983,019 B2
(45) Date of Patent: Apr. 20, 2021

(54) MAGNETOELASTIC TYPE TORQUE SENSOR WITH TEMPERATURE DEPENDENT ERROR COMPENSATION

(71) Applicant: KA Group AG, Zurich (CH)

(72) Inventor: Nikolai Panine, Quebec (CA)

(73) Assignee: KA Group AG, Zürich (CH)

( * ) Notice: Subject to any disclaimer, the term of this patent is extended or adjusted under 35 U.S.C. 154(b) by 133 days.

(21) Appl. No.: 16/244,744

(22) Filed: Jan. 10, 2019

(65) Prior Publication Data

US 2020/0225103 A1 Jul. 16, 2020

(51) Int. Cl.
*G01L 3/10* (2006.01)
*G01K 1/14* (2021.01)
*G01L 5/22* (2006.01)
*G01L 25/00* (2006.01)

(52) U.S. Cl.
CPC .............. *G01L 3/102* (2013.01); *G01K 1/14* (2013.01); *G01L 5/221* (2013.01); *G01L 25/003* (2013.01); *G01L 3/105* (2013.01)

(58) Field of Classification Search
CPC ....... G01L 3/102; G01L 5/221; G01L 25/003; G01L 3/105; G01K 1/14
See application file for complete search history.

(56) References Cited

U.S. PATENT DOCUMENTS

| | | |
|---|---|---|
| 3,263,796 A | 8/1966 | Parke |
| 4,656,750 A | 4/1987 | Pitt et al. |
| 4,896,544 A | 1/1990 | Garshelis |
| 4,989,460 A | 2/1991 | Mizuno et al. |
| 5,307,690 A | 5/1994 | Hanazawa |
| 5,419,207 A | 5/1995 | Kobayashi et al. |
| 5,522,269 A | 6/1996 | Takeda et al. |
| 5,526,704 A | 6/1996 | Hoshina et al. |

(Continued)

FOREIGN PATENT DOCUMENTS

| | | |
|---|---|---|
| CN | 2903949 Y | 5/2007 |
| DE | 3206503 C1 | 8/1983 |

(Continued)

OTHER PUBLICATIONS

Supplementay European Search Report for Application EP 16 90 2283.7 dated Nov. 18, 2019, 2 pages.

(Continued)

*Primary Examiner* — Jonathan M Dunlap
(74) *Attorney, Agent, or Firm* — Howard & Howard Attorneys PLLC

(57) ABSTRACT

A torque sensor assembly comprises a shaft configured to receive an applied torque. The shaft comprises at least one region, which is magneto-elastic and configured to generate a magnetic field in response to the applied torque. A pair of sensing coils disposed adjacent to the region is configured to sense the magnetic field. One or more sensors sense a temperature of each of the sensing coils. A controller is coupled to the pair of sensing coils and the sensor(s). The controller is configured to receive the sensed temperature of each of the sensing coils, determine a temperature difference between the sensing coils and generate an output signal based on the sensed magnetic field. The output signal accounts for the temperature difference between the sensing coils.

19 Claims, 11 Drawing Sheets

(56) References Cited

U.S. PATENT DOCUMENTS

| | | | |
|---|---|---|---|
| 5,562,004 A | 10/1996 | Kaise et al. | |
| 5,589,645 A | 12/1996 | Kobayashi et al. | |
| 5,939,881 A | 8/1999 | Slater et al. | |
| 6,047,605 A | 4/2000 | Garshelis | |
| 6,222,363 B1 | 4/2001 | Cripe | |
| 6,278,271 B1 | 8/2001 | Schott | |
| 6,341,534 B1 | 1/2002 | Dombrowski | |
| 6,499,559 B2 | 12/2002 | McCann et al. | |
| 6,522,130 B1 | 2/2003 | Lutz | |
| 6,768,301 B1 | 7/2004 | Hohe et al. | |
| 6,807,871 B1 | 10/2004 | Paek | |
| 7,235,968 B2 | 6/2007 | Popovic et al. | |
| 7,308,835 B2 | 12/2007 | Cripe | |
| 7,362,096 B2 * | 4/2008 | Oberdier | G01D 3/036 324/209 |
| 7,389,702 B2 | 6/2008 | Ouyang et al. | |
| 7,391,211 B2 | 6/2008 | Cripe | |
| 7,409,878 B2 * | 8/2008 | Von Beck | G01L 3/102 324/207.21 |
| 7,506,554 B2 * | 3/2009 | Shimizu | G01L 3/102 73/862.331 |
| 7,969,148 B2 | 6/2011 | Noguchi et al. | |
| 8,087,304 B2 * | 1/2012 | Lee | G01R 33/07 73/862.333 |
| 8,373,410 B2 | 2/2013 | Frachon | |
| 8,578,794 B2 | 11/2013 | Lee | |
| 8,677,835 B2 * | 3/2014 | Goto | G01L 25/003 73/862.193 |
| 8,844,379 B2 | 9/2014 | Pietron et al. | |
| 8,890,514 B2 | 11/2014 | Masson et al. | |
| 9,024,622 B2 | 5/2015 | Hohe et al. | |
| 9,151,686 B2 | 10/2015 | Barraco et al. | |
| 9,254,863 B2 * | 2/2016 | Kuwahara | G01L 25/006 |
| 9,494,661 B2 | 11/2016 | Paul et al. | |
| 9,575,141 B2 | 2/2017 | Rohrer | |
| 9,683,906 B2 | 6/2017 | Gießibl | |
| 10,151,652 B2 * | 12/2018 | Gie ibl | G01R 33/02 |
| 2001/0029791 A1 | 10/2001 | Sezaki | |
| 2004/0119470 A1 * | 6/2004 | Yajima | G01V 3/105 324/253 |
| 2005/0204830 A1 | 9/2005 | Kuroda et al. | |
| 2005/0204831 A1 | 9/2005 | Mori et al. | |
| 2007/0028709 A1 | 2/2007 | Futamura et al. | |
| 2007/0034021 A1 * | 2/2007 | Cripe | G01L 3/102 73/862.331 |
| 2007/0096724 A1 * | 5/2007 | Oberdier | G01L 1/127 324/209 |
| 2008/0048179 A1 | 2/2008 | Shin et al. | |
| 2008/0221399 A1 | 9/2008 | Zhou et al. | |
| 2009/0072818 A1 | 3/2009 | Mizuno et al. | |
| 2010/0097059 A1 | 4/2010 | Estrada et al. | |
| 2010/0156394 A1 | 6/2010 | Ausserlechner et al. | |
| 2010/0328799 A1 | 12/2010 | Braganca et al. | |
| 2011/0106557 A1 | 5/2011 | Gazula | |
| 2011/0162464 A1 | 7/2011 | Weng | |
| 2012/0007597 A1 | 1/2012 | Seeger et al. | |
| 2012/0007598 A1 | 1/2012 | Lo et al. | |
| 2013/0125669 A1 | 5/2013 | Barraco et al. | |
| 2013/0181702 A1 * | 7/2013 | May | G01L 1/127 324/243 |
| 2013/0218517 A1 | 8/2013 | Ausserlechner | |
| 2013/0285651 A1 | 10/2013 | Wan et al. | |
| 2014/0195117 A1 * | 7/2014 | Kuwahara | G01L 25/006 701/41 |
| 2014/0197820 A1 | 7/2014 | Ritter et al. | |
| 2014/0197822 A1 | 7/2014 | Ritter et al. | |
| 2014/0354270 A1 | 12/2014 | Kawano et al. | |
| 2015/0057885 A1 | 2/2015 | Brady et al. | |
| 2015/0230294 A1 * | 8/2015 | Tonomura | H05B 6/145 219/674 |
| 2015/0253162 A1 | 9/2015 | Kusumi et al. | |
| 2015/0274204 A1 | 10/2015 | Shiraishi et al. | |
| 2016/0121924 A1 | 5/2016 | Norstad | |
| 2016/0238472 A1 | 8/2016 | Gie ibl | |
| 2017/0324930 A1 | 11/2017 | Shaya | |
| 2017/0356822 A1 | 12/2017 | Gie ibl | |
| 2017/0370788 A1 | 12/2017 | Neuschaefer-Rube et al. | |
| 2018/0231425 A1 * | 8/2018 | Raths Ponce | G01L 3/102 |
| 2019/0178683 A1 | 6/2019 | Tetreault et al. | |
| 2020/0088594 A1 * | 3/2020 | Simard | G01R 33/072 |

FOREIGN PATENT DOCUMENTS

| | | |
|---|---|---|
| DE | 102015202240 B3 | 2/2016 |
| EP | 0067974 A2 | 12/1982 |
| EP | 0217640 A2 | 4/1987 |
| EP | 0362890 A2 | 4/1990 |
| EP | 0609463 A1 | 8/1994 |
| EP | 0697602 A2 | 2/1996 |
| EP | 0947846 A2 | 10/1999 |
| EP | 1206707 A1 | 5/2002 |
| EP | 1211494 A1 | 6/2002 |
| EP | 1243905 A1 | 9/2002 |
| EP | 1319934 A2 | 6/2003 |
| EP | 1400795 A1 | 3/2004 |
| EP | 1518131 A1 | 3/2005 |
| EP | 1668378 A1 | 6/2006 |
| EP | 1795864 A1 | 6/2007 |
| EP | 1949057 A2 | 7/2008 |
| EP | 1950545 A2 | 7/2008 |
| EP | 2049910 A2 | 4/2009 |
| EP | 2260278 A2 | 12/2010 |
| EP | 2065691 B1 | 12/2011 |
| EP | 2527857 A2 | 11/2012 |
| EP | 1386127 B1 | 1/2013 |
| EP | 2766740 A1 | 8/2014 |
| EP | 2799827 A1 | 11/2014 |
| EP | 2806283 A2 | 11/2014 |
| JP | S6141935 A | 2/1986 |
| JP | H0116349 B2 | 3/1989 |
| JP | H01187425 A | 7/1989 |
| JP | H02280023 A | 11/1990 |
| JP | H02280024 A | 11/1990 |
| JP | H041542 A | 1/1992 |
| JP | H04191630 A | 7/1992 |
| JP | H0545240 A | 2/1993 |
| JP | H05066164 A | 3/1993 |
| JP | H05126654 A | 5/1993 |
| JP | H0540849 U | 6/1993 |
| JP | H0543040 U | 6/1993 |
| JP | H0545537 U | 6/1993 |
| JP | H05045538 U | 6/1993 |
| JP | H05231966 A | 9/1993 |
| JP | H05231967 A | 9/1993 |
| JP | H05346360 A | 12/1993 |
| JP | H06014939 U | 2/1994 |
| JP | H0674844 A | 3/1994 |
| JP | H0628673 U | 4/1994 |
| JP | H06047832 U | 6/1994 |
| JP | H06258158 A | 9/1994 |
| JP | H06300647 A | 10/1994 |
| JP | H06323930 A | 11/1994 |
| JP | H072943 U | 1/1995 |
| JP | H0780756 A | 3/1995 |
| JP | H07159258 A | 6/1995 |
| JP | H0743521 U | 8/1995 |
| JP | H085477 A | 1/1996 |
| JP | H08043216 A | 2/1996 |
| JP | H0985587 A | 3/1997 |
| JP | H0995247 A | 4/1997 |
| JP | H09189624 A | 7/1997 |
| JP | 2001050830 A | 2/2001 |
| JP | 2002333375 A | 11/2002 |
| JP | 2002340701 A | 11/2002 |
| JP | 2003307460 A | 10/2003 |
| JP | 2004053433 A | 2/2004 |
| JP | 2004053434 A | 2/2004 |
| JP | 2004053435 A | 2/2004 |
| JP | 2004225096 A | 8/2004 |
| JP | 2004264188 A | 9/2004 |
| JP | 2005321272 A | 11/2005 |
| JP | 2006010669 A | 1/2006 |
| JP | 2006126130 A | 5/2006 |

(56) References Cited

FOREIGN PATENT DOCUMENTS

| | | | |
|---|---|---|---|
| JP | 2007101427 A | 4/2007 | |
| JP | 2007181327 A | 7/2007 | |
| JP | 2008026160 A | 2/2008 | |
| JP | 2009122042 A | 6/2009 | |
| JP | 2013053954 A | 3/2013 | |
| JP | 2013053957 A | 3/2013 | |
| JP | 2015009602 A | 1/2015 | |
| JP | 2015010870 A | 1/2015 | |
| KR | 20050075880 A | 7/2005 | |
| KR | 20050093025 A | 9/2005 | |
| KR | 20060054775 A | 5/2006 | |
| KR | 20070004377 A | 1/2007 | |
| WO | 200118556 A1 | 3/2001 | |
| WO | 200192906 A2 | 12/2001 | |
| WO | 2003006922 A1 | 1/2003 | |
| WO | 200405873 A1 | 1/2004 | |
| WO | 2004003585 A1 | 1/2004 | |
| WO | 2005029106 A1 | 3/2005 | |
| WO | 200554803 A1 | 6/2005 | |
| WO | 2007092402 A2 | 8/2007 | |
| WO | 2008017348 A2 | 2/2008 | |
| WO | 2011119317 A1 | 9/2011 | |
| WO | 2013053534 A1 | 4/2013 | |
| WO | 2017199063 A1 | 11/2017 | |
| WO | 2017214361 A1 | 12/2017 | |
| WO | 2018109674 A1 | 6/2018 | |

OTHER PUBLICATIONS

English language abstract for JPH0545240A extracted from espacenet.com database on Aug. 1, 2019, 1 page.
English language abstract for JPH0566164A extracted from espacenet.com database on Aug. 1, 2019, 1 page.
English language abstract for JPH06258158A extracted from espacenet.com database on Aug. 1, 2019, 1 page.
English language abstract for JPH06300647A extracted from espacenet.com database on Aug. 1, 2019, 1 page.
English language abstract for JPH06323930A extracted from espacenet.com database on Aug. 1, 2019, 1 page.
English language abstract for JPH0674844A extracted from espacenet.com database on Aug. 1, 2019, 1 page.
English language abstract for JPH07159258A extracted from espacenet.com database on Aug. 1, 2019, 1 page.
English language abstract for JPH0780756A extracted from espacenet.com database on Aug. 1, 2019, 1 page.
English language abstract for JPH0843216A extracted from espacenet.com database on Aug. 1, 2019, 1 page.
English language abstract for JPH085477A extracted from espacenet.com database on Aug. 1, 2019, 1 page.
English language abstract for JPH09189624A extracted from espacenet.com database on Aug. 1, 2019, 1 page.
English language abstract for JPH0985587A extracted from espacenet.com database on Aug. 1, 2019, 1 page.
English language abstract for JPH0995247A extracted from espacenet.com database on Aug. 1, 2019, 1 page.
English language abstract for JPS6141935A extracted from espacenet.com database on Aug. 1, 2019, 1 page.
English language abstract for KR20070004377A extracted from espacenet.com database on Aug. 1, 2019, 1 page.
English language abstract for WO0118556A1 extracted from espacenet.com database on Jan. 7, 2019, 2 pages.
English language abstract for WO2004005873A1 extracted from espacenet.com database on Aug. 1, 2019, 2 pages.
English language abstract for WO2005029106A1 extracted from espacenet.com database on Jan. 7, 2019, 2 pages.
English language abstract for WO2005054803A1 extracted from espacenet.com database on Aug. 1, 2019, 2 pages.
English language abstract for WO2008017348A2 extracted from espacenet.com database on Jan. 7, 2019, 2 pages.

English language abstract for WO2013053534A1 extracted from espacenet.com database on Jan. 7, 2019, 1 page.
International Search Report for Application No. PCT/IB2016/052876 dated Jan. 19, 2017, 4 pages.
International Search Report for Application No. PCT/IB2017/057858 dated Mar. 29, 2018, 5 pages.
Melexis, "MLX90316—Rotary Position Sensor IC Data Sheet", 3901090316, Rev. 10, Jul. 2013, 45 pages.
Melexis, "MLX90333—Position Sensor Data Sheet", Revision 008, Sep. 26, 2017, 48 pages.
Melexis, "MLX90363—Triaxis Magnetometer IC With High Speed Serial Interface Data Sheet", 3901090363, Rev. 005, Jul. 2013, 57 pages.
Microelectronic Integrated Systems (MELIXIS), "MLX90316 Rotary Position Sensor IC Manual", Revision 10, Jul. 2013, pp. 1-45.
Microelectronic Integrated Systems (MELIXIS), "MLX90363 Triaxis Magnetometer IC With High Speed Serial Interface Data Sheet", Revision 005, Jul. 2013, pp. 1-57.
Moving Magnet Technologies SA (MMT), "Magnetic Field Angle Position Sensors and Rotary Sensors", http://www.movingmagnet.com/en/analog-magnetic-field-angle-measurement/, 2016, 1 page.
Poincare, Jules Henri, "Exploring Magnetism—Session 1: Magnetism", http://cse.ssl.berkeley.edu/SegwayEd/lessons/exploring_magnetism/Exploring_Magnetism/s1.html, 2016, 6 pages.
Regents of the University of California Berkeley, "Exploring Magnetism—Session 1", http://cse.ssl.berkeley.edu/SegwayEd/lessons/exploring_magnetism/Exploring_Magnetism/s1.html, 2005, 6 pages.
U.S. Appl. No. 16/468,584, filed Jun. 11, 2019.
U.S. Appl. No. 62/433,073, filed Dec. 1, 2016.
Banks, Kevin, "The Goertzel Algorithm", Aug. 28, 2002, https://www.embedded.com/design/configurable-systems/4024443/The-Goertzel-Algorithm#, 5 pages.
Computer-Assisted English language abstract for EP2806283A2 extracted from espacenet.com database on Jan. 7, 2019, 4 pages.
Computer-generated English language translation for JPH0540849U extracted from espacenet.com database on Aug. 1, 2019, 7 pages.
Computer-generated English language translation for JPH0543040U extracted from espacenet.com database on Aug. 1, 2019, 6 pages.
Computer-generated English language translation for JPH0545537U extracted from espacenet.com database on Aug. 1, 2019, 9 pages.
Computer-generated English language translation for JPH0545538U extracted from espacenet.com database on Aug. 1, 2019, 8 pages.
Computer-generated English language translation for JPH0614939U extracted from espacenet.com database on Aug. 1, 2019, 10 pages.
Computer-generated English language translation for JPH0628673U extracted from espacenet.com database on Aug. 1, 2019, 6 pages.
Computer-generated English language translation for JPH0647832U extracted from espacenet.com database on Aug. 1, 2019, 9 pages.
Computer-generated English language translation for JPH072943U extracted from espacenet.com database on Aug. 1, 2019, 8 pages.
Computer-generated English language translation for JPH0743521U extracted from espacenet.com database on Aug. 1, 2019, 8 pages.
Computer-generated English language translation for KR20050075880A extracted from espacenet.com database on Aug. 1, 2019, 4 pages.
Computer-generated English language translation for KR20050093025A extracted from espacenet.com database on Aug. 1, 2019, 4 pages.
Computer-generated English language translation for KR20060054775A extracted from espacenet.com database on Aug. 1, 2019, 4 pages.
English language abstract for CN2903949Y extracted from espacenet.com database on Aug. 1, 2019, 1 page.
English language abstract for DE3206503C1 extracted from espacenet.com database on Aug. 1, 2019, 1 page.
English language abstract for EP1243905A1 extracted from espacenet.com database on Jul. 17, 2019, 1 page.
English language abstract for EP0947846A2 extracted from espacenet.com database on Jan. 7, 2019, 1 page.
English language abstract for EP1243905A1 extracted from espacenet.com database on Aug. 1, 2019, 1 page.
English language abstract for EP1319934a2 extracted from espacenet.com database on Aug. 1, 2019, 2 pages.
English language abstract for JP2001050830A extracted from espacenet.com database on Aug. 1, 2019, 1 page.

(56) References Cited

OTHER PUBLICATIONS

English language abstract for JP2002333375A extracted from espacenet.com database on Aug. 1, 2019, 1 page.
English language abstract for JP2002340701A extracted from espacenet.com database on Aug. 1, 2019, 1 page.
English language abstract for JP2003307460A extracted from espacenet.com database on Aug. 1, 2019, 1 page.
English language abstract for JP2004053433A extracted from espacenet.com database on Aug. 1, 2019, 1 page.
English language abstract for JP2004053434A extracted from espacenet.com database on Aug. 1, 2019, 1 page.
English language abstract for JP2004053435A extracted from espacenet.com database on Aug. 1, 2019, 1 page.
English language abstract for JP2004225096A extracted from espacenet.com database on Aug. 1, 2019, 1 page.
English language abstract for JP2004264188A extracted from espacenet.com database on Aug. 1, 2019, 1 page.
English language abstract for JP2005321272A extracted from espacenet.com database on Aug. 1, 2019, 1 page.
English language abstract for JP2006010669A extracted from espacenet.com database on Aug. 1, 2019, 1 page.
English language abstract for JP2006126130A extracted from espacenet.com database on Aug. 1, 2019, 1 page.
English language abstract for JP2007101427A extracted from espacenet.com database on Aug. 1, 2019, 1 page.
English language abstract for JP2007181327A extracted from espacenet.com database on Aug. 1, 2019, 1 page.
English language abstract for JP2008026160A extracted from espacenet.com database on Aug. 1, 2019, 1 page.
English language abstract for JP2009122042A extracted from espacenet.com database on Aug. 1, 2019, 1 page.
English language abstract for JP2013053954A extracted from espacenet.com database on Aug. 1, 2019, 1 page.
English language abstract for JP2013053957A extracted from espacenet.com database on Aug. 1, 2019, 1 page.
English language abstract for JP2015009602A extracted from espacenet.com database on Aug. 1, 2019, 1 page.
English language abstract for JP2015010870A extracted from espacenet.com database on Aug. 1, 2019, 1 page.
English language abstract for JPH0116349B2 extracted from espacenet.com database on Aug. 1, 2019, 1 page.
English language abstract for JPH01187425A extracted from espacenet.com database on Aug. 1, 2019, 1 page.
English language abstract for JPH02280023A extracted from espacenet.com database on Aug. 1, 2019, 1 page.
English language abstract for JPH02280024A extracted from espacenet.com database on Aug. 1, 2019, 1 page.
English language abstract for JPH041542A extracted from espacenet.com database on Aug. 1, 2019, 1 page.
English language abstract for JPH04191630A extracted from espacenet.com database on Aug. 1, 2019, 1 page.
English language abstract for JPH05126654A extracted from espacenet.com database on Aug. 1, 2019, 1 page.
English language abstract for JPH05231966A extracted from espacenet.com database on Aug. 1, 2019, 1 page.
English language abstract for JPH05231967A extracted from espacenet.com database on Aug. 1, 2019, 1 page.
English language abstract for JPH05346360A extracted from espacenet.com database on Aug. 1, 2019, 1 page.
Supplementary European Search Report for Application EP 17 88 0586 dated.Jun. 23, 2020, 2 pages.
Machine-assisted English language abstract for DE 10 2015 202 240 B3 extracted from espacenet.com database on Jul. 29, 2020, 2 pages.

\* cited by examiner

Digitized Voltages for Resistance Estimation Process of Left Pair of Coils

Digitized Voltages for Resistance Estimation Process of Right Pair of Coils

MAGNETOELASTIC TYPE TORQUE SENSOR WITH TEMPERATURE DEPENDENT ERROR COMPENSATION

TECHNICAL FIELD

The present disclosure relates to magneto-elastic torque sensors.

BACKGROUND

Torque sensors are typically used in vehicular sub-systems, such as electronic power-assisted steering systems. Torque sensors used in electronic power-assisted steering systems may be influenced by thermal errors, for example, due to heat radiating from the engine compartment. To account for thermal error, torque sensors may employ a switch to change modes between torque and temperature measurement. These solutions, however increase cost of the sensor, and do not continuously measure torque. In addition, a magnetic field arising from the temperature measurement has a negative effect on an accuracy of torque detection. These additional thermistors and switch limit a possibility of a low cost torque sensor. As such, there is a need in the art for systems and methods for addressing at least the aforementioned problems.

SUMMARY

This Summary introduces a selection of concepts in a simplified form that are further described below in the Detailed Description below. This Summary is not intended to identify key features or essential features of the claimed subject matter.

One example of a torque sensor assembly is provided. The torque sensor assembly comprises a shaft configured to receive an applied torque and comprising at least one region being magneto-elastic and being configured to generate a magnetic field in response to the applied torque. The torque sensor assembly comprises a first pair of sensing coils disposed adjacent to the region and being configured to sense the magnetic field. A sensor is configured to sense a temperature of each of the sensing coils and a controller is coupled to the first pair of sensing coils and the sensor. The controller is configured to receive the sensed temperature of each of the sensing coils and determine a temperature difference between the sensing coils. The controller is configured to generate an output signal based on the sensed magnetic field wherein the output signal accounts for the temperature difference between the sensing coils.

One example of a method of operating a torque sensor assembly is provided. The torque sensor assembly comprises a shaft configured to receive an applied torque and comprising at least one region being magneto-elastic and being configured to generate a magnetic field in response to the applied torque. The torque sensor assembly comprises a first pair of sensing coils disposed adjacent to the region and being configured to sense the magnetic field. A sensor is configured to sense a temperature of each of the sensing coils and a controller is coupled to the first pair of sensing coils and the sensor. The method comprises the controller receiving the sensed temperature of each of the sensing coils and determining a temperature difference between the sensing coils. The method comprises the controller generating an output signal based on the sensed magnetic field wherein the output signal accounts for the temperature difference between the sensing coils.

One example of a vehicular sub-system is provided. The vehicular sub-system comprises a vehicular component configured to provide an applied torque and a torque sensor assembly configured to be coupled with the vehicular component. The torque sensor assembly comprises a shaft configured to receive the applied torque and at least one region being magneto-elastic and being configured to generate a magnetic field in response to the applied torque. The torque sensor assembly comprises a pair of sensing coils disposed adjacent to the region and being configured to sense the magnetic field. A sensor is configured to sense a temperature of each of the sensing coils and a controller is coupled to the pair of sensing coils and the sensor. The controller is configured to receive the sensed temperature of each of the sensing coils and determine a temperature difference between the sensing coils. The controller is configured to generate an output signal based on the sensed magnetic field wherein the output signal accounts for the temperature difference between the sensing coils.

Advantages of the torque sensor assembly and methods of operating the same are described herein and will be understood in view of the Detailed Description and Drawings.

BRIEF DESCRIPTION OF THE DRAWINGS

Other aspects, features, and advantages of the present invention will become more fully apparent from the detailed description, the appended claims, and the accompanying drawings wherein like reference numerals identify similar or identical elements.

DETAILED DESCRIPTION

Figure 1A:
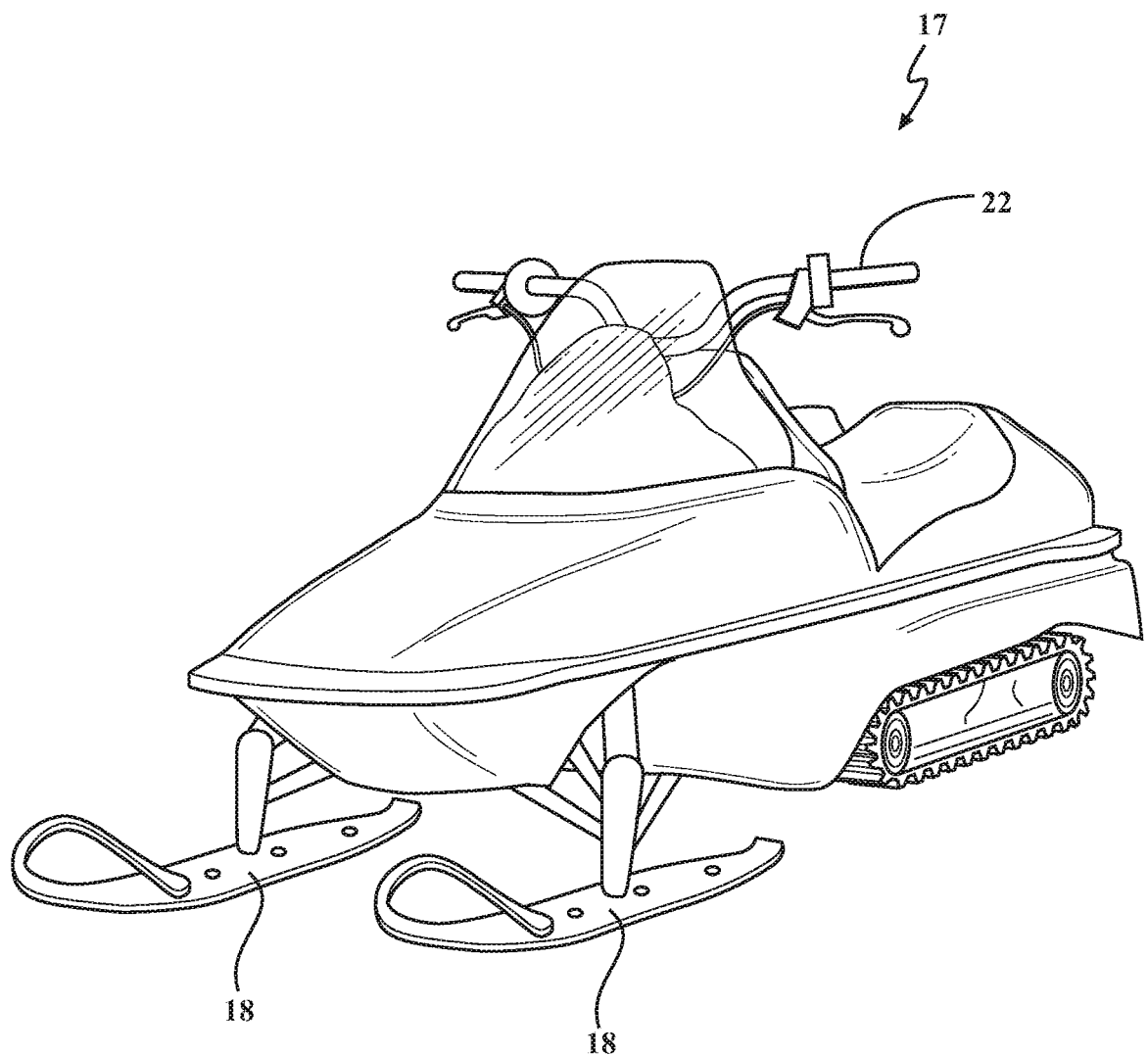
FIG. 1A is a perspective view of an exemplary vehicle which may incorporate a power steering system of the present invention.
Figure 1B:
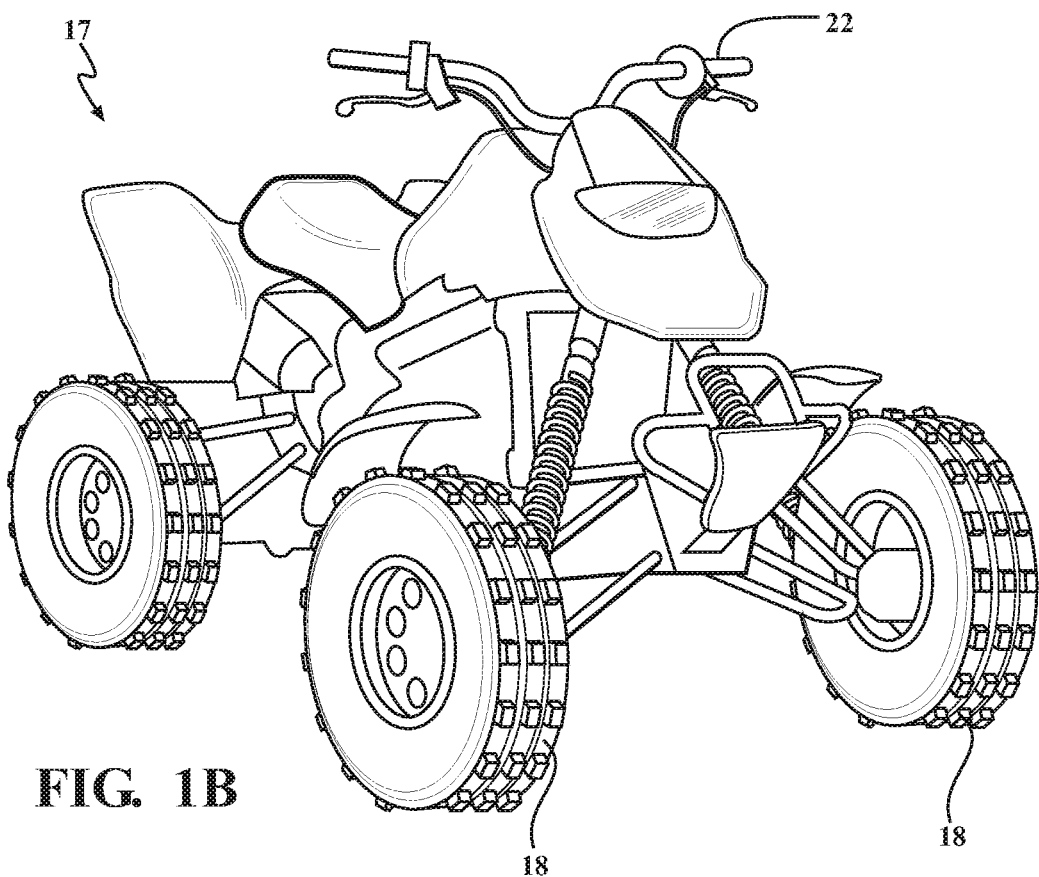
FIG. 1B is a perspective view of another exemplary vehicle which may incorporate the power steering system of the present invention.

Referring to the Figures, an exemplary vehicle 17 is shown in FIGS. 1A and 1B. The vehicle 17 may be a snowmobile, an all-terrain vehicle (ATV) such as a four wheeler, a three wheeler, and the like, a motorcycle or any other similar vehicle. However, it is also contemplated that the vehicle 17 may be any type of vehicle as known by one of ordinary skill in the art including a standard car, a full size or standard size truck, a semi-truck, and the like without departing from the spirit of the invention.

Figure 2:
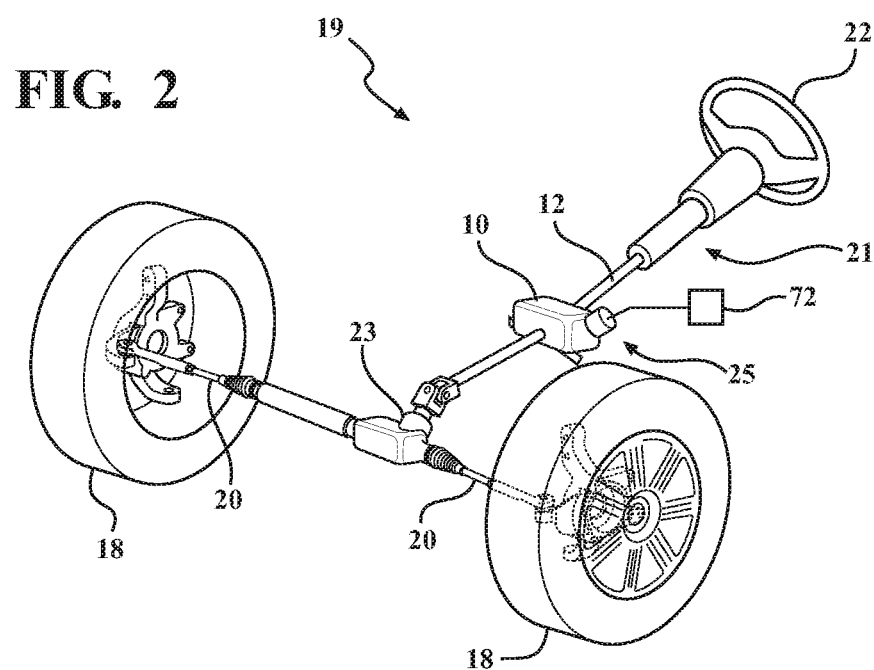
FIG. 2 is a perspective view of a steering assembly of a vehicle which may incorporate the power steering system of the present invention.

FIG. 2 shows an exemplary steering assembly 19 of the vehicle 17. The steering assembly 19 includes a steering column 21 coupled to a steering rack 23 which is coupled to ground engaging members 18. It is also contemplated that the steering assembly 19 may comprise any mechanical link between the steering column 21 and the ground engaging members 18 as known by one of ordinary skill in the art including but not limited to linkages. The ground engaging members 18 may include a sled or tire as known by one of ordinary skill in the art. Generally, the ground engaging members 18 are coupled to steering rods 20. Movement of a user operated steering element 22, such as a steering wheel as illustrated in FIG. 2, or a handlebar as illustrated in FIG. 1A on the vehicle 10 causes movement of the steering rods 20 which turns the ground engaging members 18. It is additionally contemplated that the steering assembly 19 may be a different user operated steering assembly which operates as known by one of ordinary skill in the art.

The steering assembly 19 additionally includes a power steering system 25. In the embodiment illustrated in the Figures, the power steering system 25 is an electric power steering system. However, it is contemplated that the power steering system 25 may be any power steering system as known by one of ordinary skill in the art. The power steering system 25 may be programmable such that the power steering system 25 can account for various vehicle conditions. In one exemplary embodiment, the power steering system 25 includes a controller 72 which may receive and deliver various inputs and outputs to and from various portions of the vehicle 17. Additionally, the controller 72 may execute various calculations and computations based on one or more inputs from a torque sensor assembly 10, described in more detail below.

Figure 3:
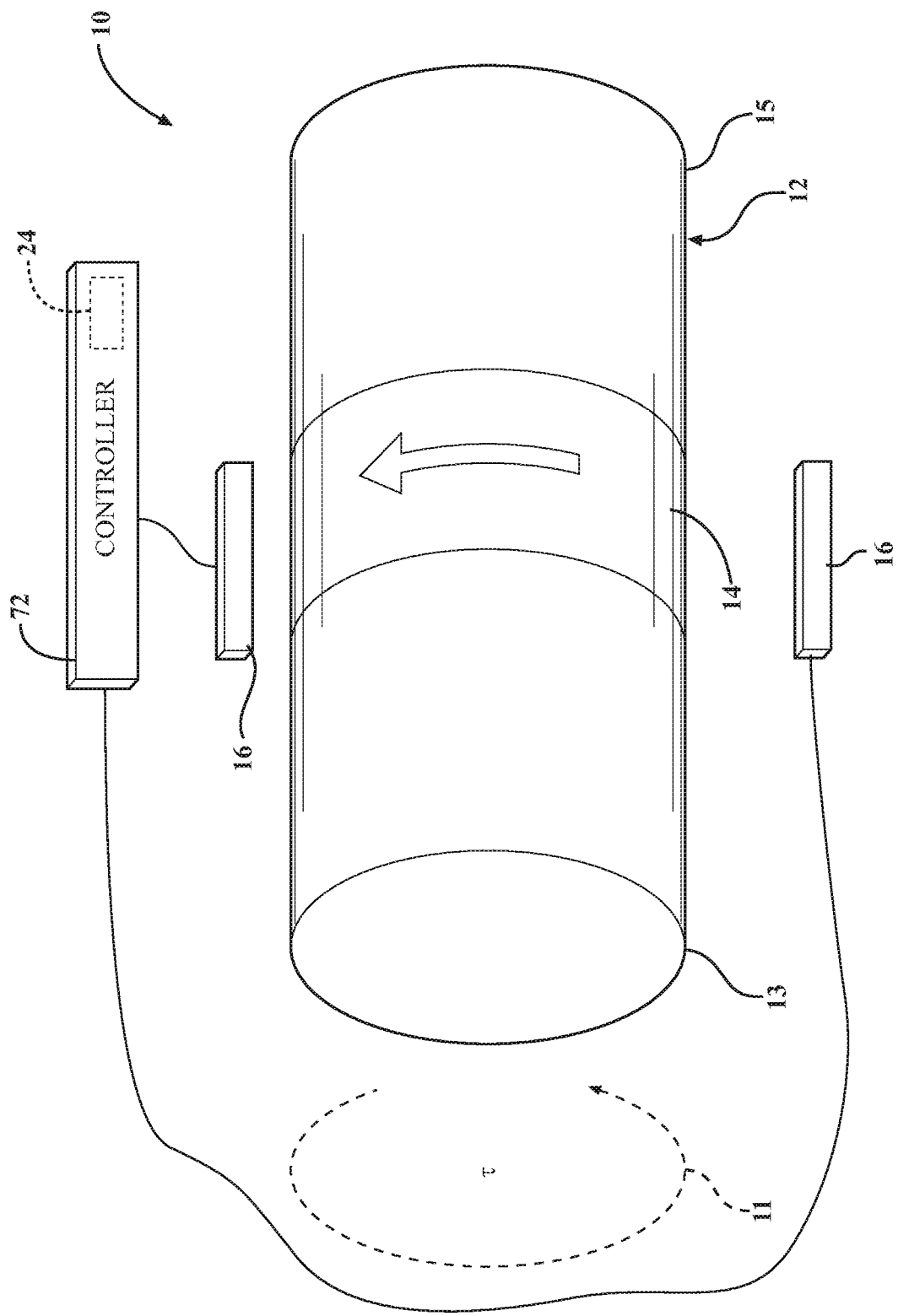
FIG. 3 depicts a schematic view of one example of a torque sensor assembly.

FIG. 3 illustrates one instance of a torque sensor assembly 10 for measuring an applied torque 11. The torque sensor assembly 10 may be utilized in suitable applications and for any suitable component or system where the applied torque 11 is measured. For example, the torque sensor assembly 10 may be utilized in, but not limited to, vehicular systems, such as electric power steering systems.

Referring to the instance of FIG. 3, the torque sensor assembly 10 comprises a shaft 12 to which the torque 11 is applied. The shaft 12 can comprise a first end 13 and a second end 15 opposite the first end 13. The applied torque 11, illustrated as having magnitude τ, is applied to the first end 13 of the shaft 12. However, the applied torque 11 may be applied to any section of the shaft 12. For example, the applied torque 11 may be applied to the second end 15 of the shaft 12 or at any point between first and second ends 13, 15 of the shaft 12. Furthermore, the applied torque 11 may be applied simultaneously to more than one section of the shaft 12. Additionally, the applied torque 11 may be applied in clockwise or counterclockwise directions when viewed from the perspective facing the first end 13 of the shaft 12. Depending on the system that utilizes the torque sensor assembly 10, the applied torque 11 may be applied in either or both directions.

Although the shaft 12, as shown in FIG. 3, has a cylindrical configuration, the shaft 12 may have any suitable shape defining any suitable cross-sectional area (e.g. a square, a triangle, an oval, an octagon, etc.) for enabling the torque sensor assembly 10 to properly function. Additionally, in other instances, the shaft 12 may be hollow or solid. Furthermore, in some instances, the shaft 12 may be stationary and fixed at ends 13, 15 to a larger system, which enables application of the applied torque 11 to deform the shaft 12. In other instances, the shaft 12 may rotate without application of the applied torque 11.

As shown in FIG. 3, the shaft 12 may include a first region 14, which may be magneto-elastic. By being magneto-elastic, the first region 14 is configured to generate or change a magnetic field in response to the applied torque causing a sheer stress to the shaft 12. The magnetic field can be an inherent characteristic of the shaft 12 design. In some examples, the magneto-elastic properties can be anisotropic. For example, anisotropic magneto-elastic properties have preferential directions. The anisotropic magneto-elastic properties may be directionally dependent, in which a magnetic moment of magnetization aligns with an axis of the shaft 12.

In the instance of FIG. 3, for example, the first region 14 may be magnetized to generate a magnetic field in response to the applied torque 11 being applied to the shaft 12. In some instances, the first region 14 may be magnetized circumferentially, and carry a positive or negative polarity. In FIG. 1, the first region 14 is magnetized to have a positive polarity, as illustrated by an upward pointing arrow. The first region 14 may be referred to hereinafter as "the first magneto-elastic region 14".

As discussed in more detail below, FIG. 3 further depicts a pair of sensing coils 16 disposed adjacent the first region 14. The sensing coils 16 are configured to sense the magnetic field generated by the shaft 12 responsive to the applied torque 11. In one example, the sensing coils 16 are configured as inductors. A pair of sensing coils 16 are utilized to provide a more accurate measurement of the magnetic field than a single coil. The pair of sensing coils 16 can be disposed on opposing sides of the shaft 12, as shown in FIG. 3. Alternatively, the pair of coils 16 can be arranged in a manner different from that shown in FIG. 3, depending on factors, such as the cross-sectional shape of the shaft 12, etc.

At least one sensor 24 is configured to sense a temperature of each sensing coil 16. One or more sensors 24 may be utilized with the sensing coils 16. For example, one sensor 24 may sense a temperature of both sensing coils 16. Alternatively, one sensor 24 may sense the temperature of one of the sensing coils 16 while a second sensor 24 senses the temperature of the other sensing coil 16 of the pair. Examples of the sensor(s) 24 include, but are not limited to resistive temperature detectors, thermocouples, or any other sensor configured to sense a temperature of both sensing coils 16.

A controller 72 may be used with the torque sensor assembly 10 and is coupled to the sensing coils 16 and the sensor 24. The controller 72 may be a microprocessor or signal processing unit (SPU) and can comprise memory storing non-transitory computer readable instructions, which when executed perform any of the capabilities described herein. The controller 72 can be a unit separate connected to or integrated into the same assembly as the shaft 12, sensors 24, and coils 16

As will be described below, the controller 72 is configured to receive the sensed temperature of each of the sensing coils 16 from the sensor 24. The controller 72 determines a temperature difference between the sensing coils 16, and generates an output signal based on the sensed magnetic field. The output signal accounts for the temperature difference between the sensing coils 16.

Figure 4:
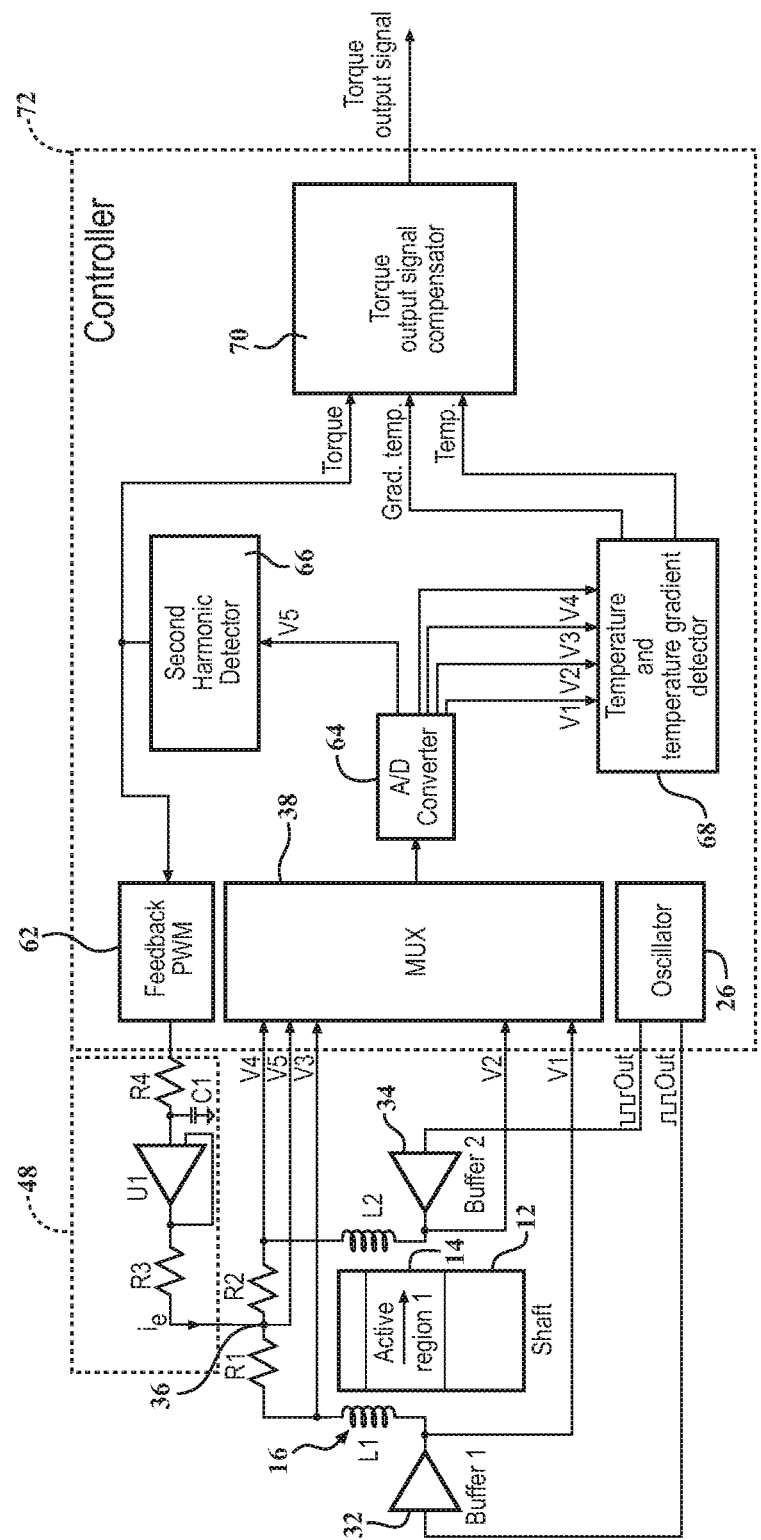
FIG. 4 depicts a schematic view of a circuit diagram for the torque sensor assembly depicted in FIG. 1.

FIG. 4 depicts a circuit diagram of one example of the torque sensor assembly 10. As depicted in FIG. 4, each coil L1, L2 of the first pair of sensing coils 16 is disposed on each side of the first region 14 of the shaft 12. Although depicted in FIG. 4 as a single pair of sensing coils 16, other configurations are also possible. For example, a configuration with a shaft 12 that has only one magnetically anisotropic active region 14 and with two or more pairs of sensing coils 16, connected in parallel or in series, in each half of a sensing coils circuit may also be used for a magneto-elastic torque sensor assembly 10 with temperature dependent error compensation.

The controller 72 comprises an oscillator 26 for energizing the coils 16 such that the coils 16 can sense the magnetic field. In one example, the oscillator 26 generates two opposite phase square wave signals that are received by first and second buffers 32, 34. The buffered square wave signals from the first and second buffers 32, 34 are input into the first pair of sensing coils 16. An amplitude and frequency of voltage of the square wave signals are selected so that an amplitude of the alternating magnetic field generated within the first pair of sensing coils 16 as a result of induced current within the coils 16 is such that cores of the first pair of sensing coils 16 become periodically saturated. In one example, the first pair of sensing coils 16 are driven into a saturated state twice every cycle of an oscillator signal. To ensure good stability and low noise, a core material should be driven well into deep saturation (by 10 and more times of its saturation field, for example).

First and second resistors R1, R2 are connected to an output of each sensing coil 16. The electrical current inducted by the sensing coils 16 is passed through each of the first and second resistors R1, R2. The sensor(s) 24 is further configured to sense the temperature of each sensing coil 16 by measuring a voltage across each of the first and second resistors R1, R2. An output of the sensing coils 16 through the first and second resistors R1, R2 are electrically tied to a common node 36. The common node 36 is also connected to an input of a scanning multiplexer 38, discussed in more detail below and a third resistor R3. When cores of the sensing coils 16 saturate, inductance of the sensing coils 16 is reduced accordingly. As long as the pair of sensing coils 16 saturate symmetrically and simultaneously during excitation, inductance of the first pair of sensing coils 16 is equal, and alternating voltage at the common node 36 corresponding to voltage is essentially zero. A total magnetic field experienced by the pair of sensing coils 16 is a sum of magnetic fields generated by the pair of sensing coils 16, the shaft 12, and any external magnetic fields. When a magnetic field is generated by the first region 14 due to applied torque 11 being applied to the shaft 12, this magnetic field is superimposed upon a magnetic field created by excitation current within the first pair of sensing coils 16.

Figure 5:
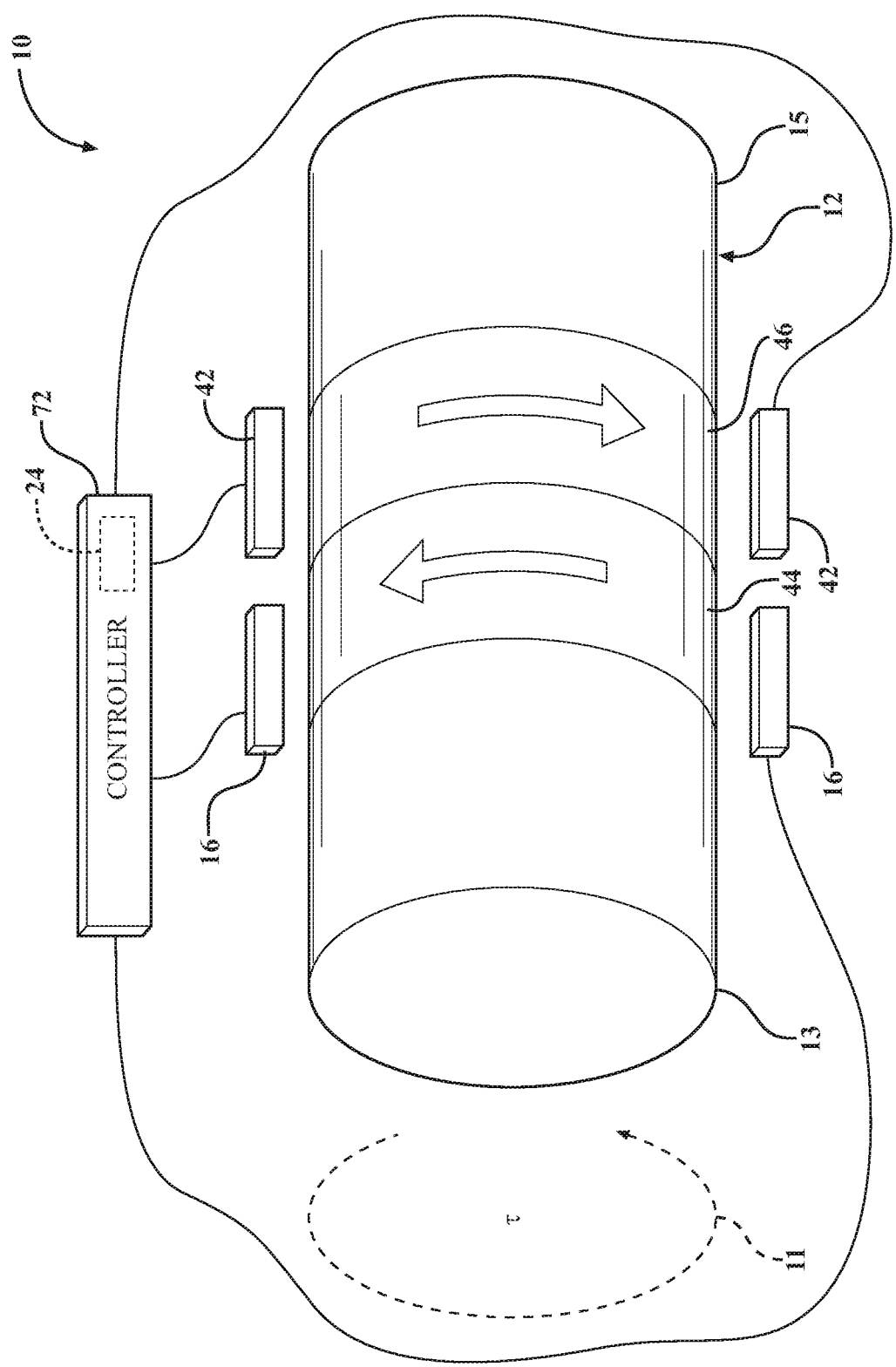
FIG. 5 depicts a schematic view of another example of the torque sensor assembly.

FIG. 5 depicts another example of the torque sensor assembly 10, wherein a second pair of sensing coils 42 are included in addition to the first pair 16. Here, the first region 14 further includes two magnetically anisotropic active regions 44, 46 having magnetization in opposite directions. The first and second pairs of sensing coils 16, 42 are disposed adjacent the active regions 44, 46. For example, the first pair of sensing coils 16 is disposed adjacent one active region 44 and the second pair of sensing coils 42 is disposed adjacent the other active region 46.

Field superposition will result in a periodic asymmetrical saturation of the first and second pairs of sensing coils 16, 42 due to opposing magnetization of the two magnetically anisotropic active regions 44, 46 of the first region 14 of the shaft 12 and the first and second pairs of sensing coils 16, 42 connection in series in opposite directions.

In a first half of an excitation cycle of the first and second pairs of sensing coils 16, 42, there is an addition of a magnetic field generated by the two active regions 44, 46 and the magnetic field created by excitation current in the first pair of sensing coils 16. In the same first half of the excitation cycle, there is a subtraction of the magnetic fields in the second pair of sensing coils 42. In the second half of the excitation cycle, opposing processes take place. For example, a subtraction of magnetic fields in the first pair of sensing coils 16 and an addition of magnetic fields in the second pair of sensing coils 42. Consequently, inductance of both the first and second pairs of sensing coils 16, 42 will not be equal over the excitation cycle. A summation of coil voltages at the common node 36 corresponding to a voltage will contain a periodic waveform containing even-order harmonics of a frequency of the oscillator signal, discussed in more detail below. An amplitude and phase of the second-harmonic component of the voltage is proportional to an amplitude and direction of the magnetic field generated by the two active regions 44, 46 of the shaft 12 and, correspondingly, to the applied torque 11 applied to the shaft 12.

If an ambient magnetic field is applied to the first and/or second pair of sensing coils 16, 42, an asymmetrical saturation of the coils' cores results. However, a summation signal resulting from addition of voltages of the first and/or second pair of sensing coils 16, 42 will consist of only odd-order harmonics of the frequency of the oscillator signal.

Figure 6:
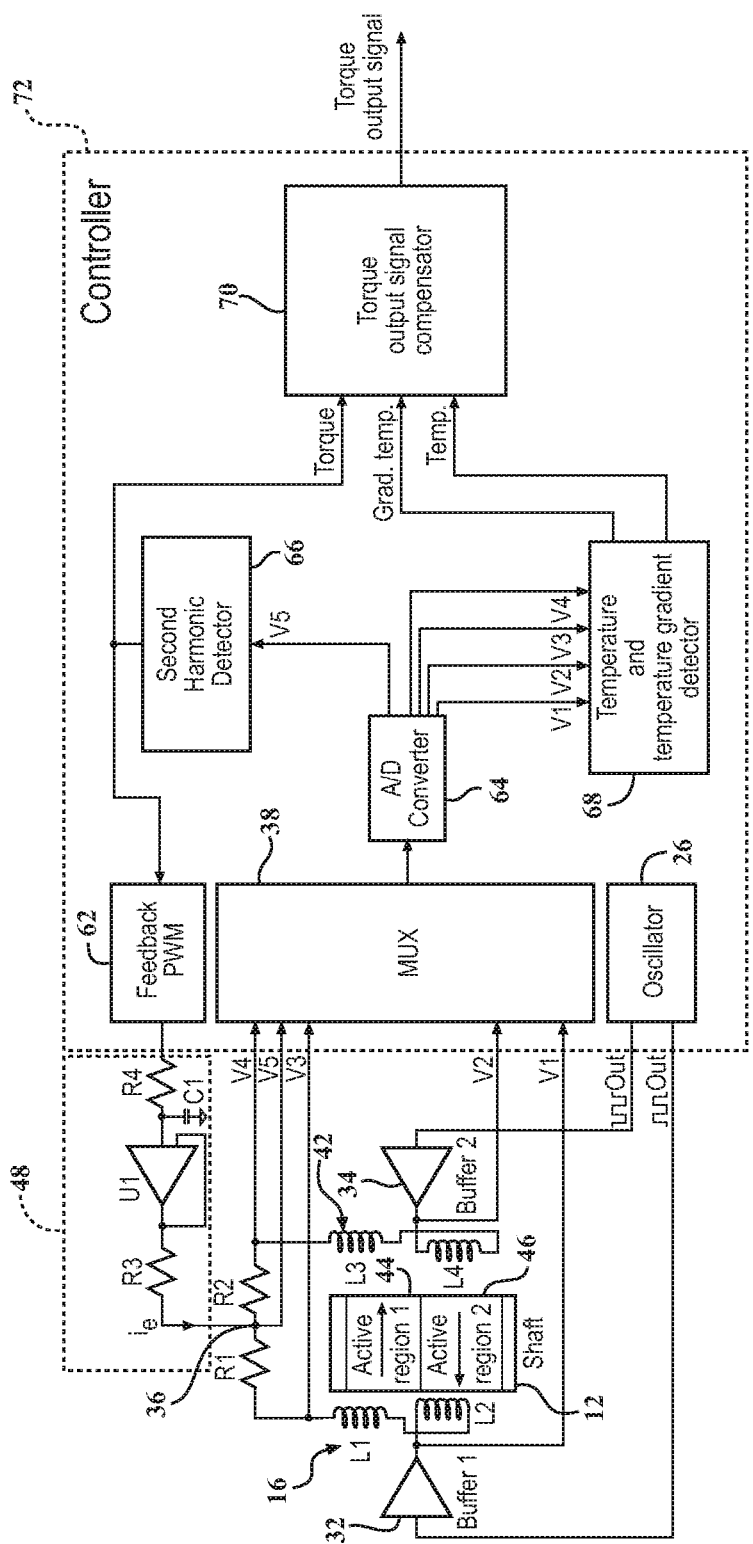
FIG. 6 depicts a schematic view of a circuit diagram for the torque sensor assembly depicted in FIG. 5.

FIG. 6 depicts a schematic view of a circuit diagram for the torque sensor assembly 10 depicted in FIG. 5, further including the first and/or second pair of sensing coils 16, 42. Although depicted in FIG. 6 as first and second pairs of sensing coils 16, 42, two or more sensing coils pairs 16, 42, connected in parallel or in series, in each half of sensing coils circuit is also contemplated. Further, a configuration with a shaft 12 with more than one pair of magnetically anisotropic active regions 44, 46 with magnetization of neighboring regions in opposite directions, and with two or more serially connected pairs of sensing coils in each half of sensing coils circuit may also be employed by the magneto-elastic torque sensor assembly 10 with temperature dependent error compensation.

Additionally, a configuration with two pairs of magnetically anisotropic active regions 44, 46, and two serially connected pairs of sensing coils 16, 42 in each of multiple parallel circuits may also provide a magneto-elastic torque sensor assembly 10 with temperature dependent error compensation. A parallel connection of two or more of serially connected pairs of sensing coils 16, 42 in each half of the sensing coils circuit may also provide a magneto-elastic torque sensor assembly 10 with temperature dependent error compensation. The processes of torque measurement described below and estimation of temperature and temperature gradient $T_{left}$, $T_{right}$, $\Delta T$ between the sensing coils are identical for all presented configurations.

The diagrams of FIG. 4 and FIG. 6 comprise similar components and any description of the architecture and capabilities of these components should be understood to apply fully to both examples. Hence, for simplicity in description, such descriptions may not be repeated for each figure separately.

In FIGS. 4 and 6, a feedback circuit 48 is employed by the torque sensor assembly 10 to provide compensation for thermal error. Such compensation can occur continuously and simultaneously while the controller 72 is measuring torque output. The feedback circuit 48 is coupled between the first and/or second pair of sensing coils 16, 42 and the controller 72. The feedback circuit 48 is formed by a capacitor C1, third and fourth resistors R3, R4 and an amplifier U1. Each of the feedback circuit 48 and the controller 72 are coupled to the first region 14 through the first and second pairs of sensing coils 16, 42 and the first and second resistors R1, R2. The feedback circuit 26 generates a feedback current $i_f$ based on a detected second harmonic component of the signal, explained in more detail below. The feedback circuit 48 injects the feedback current $i_f$ into the first and second pairs of sensing coils 16, 42 such that the first and second pairs of sensing coils 16, 42 operate at zero average field.

Still referring to FIGS. 4 and 6, the controller 72 may further comprise a feedback pulse-width modulator 62, an analog-to-digital converter 64, a second harmonic detector 66, a temperature and temperature gradient detector 68 and a torque output signal compensator 70 in addition to the oscillator 26 and the scanning multiplexer 38. In at least one further instance, the sensor 24 may include the temperature and temperature gradient detector 68, or be separate from the temperature and temperature gradient detector 68.

The scanning multiplexer 38 periodically connects nodes corresponding to voltages to the analog-to-digital converter 64 as input. As will be described in more detail below, the voltages may be input into the scanning multiplexer as five segments. The first voltage V1 is input into the scanning multiplexer 38 from the first pair of sensing coils 16 and the first buffer 32. The first voltage V1 may be used to calculate a temperature of the first pair of sensing coils 16. The second voltage V2 is input into the scanning multiplexer 38 from the second pair of sensing coils 42 and the second buffer 34. The second voltage may be used to calculate a temperature of the second pair of sensing coils 42.

The third voltage V3 is input into the scanning multiplexer 38 from the first resistor R1 and the first pair of sensing coils 16. The third voltage may be used to calculate a temperature of the first pair of sensing coils 16. The fourth voltage V4 is input into the scanning multiplexer 38 from the second resistor R2 and the second pair of sensing coils 42. The fourth voltage V4 may be used to calculate a temperature of the second pair of sensing coils 42. The fifth voltage is input into the scanning multiplexer 38 from the common node 36. The fifth voltage V5 may be used as a torque signal when compensating for the temperature and temperature differences of the first, second, third and fourth voltages V1, V2, V3, and V4.

The analog-to-digital converter 64 samples the analog signals of V1-V5 from the scanning multiplexer 38 using a scanning frequency corresponding to Nyquist rules to reduce aliasing. Digitized voltages from the analog-to-digital converter 64 are input signals for the temperature and temperature gradient detector 68 and an input signal for the second harmonic detector 66. An output signal of the second harmonic detector 66 is a resulting torque signal, which is also fed back through the feedback pulse-width modulator 62 and feedback circuit 48 to the common node 36 in order to provide a compensating current combined with current of exciting the first and/or second pairs of sensing coils 16, 42.

The feedback pulse-width modulator 62 transforms a value of the output signal of the second harmonic detector 66 to a pulse-width-modulated signal and outputs the output signal to the feedback circuit 48. The feedback circuit 48 is a buffered, low-pass filter with an output resistor 56, being the fourth resistor 56. Feedback current $i_f$ within the first and/or second pairs of sensing coils 16, 42 create a magnetic field exactly opposing a magnetic field generated by the two active regions 44, 46 of the shaft 12 so that cores of the first and second pairs of sensing coils 16, 42 operate at zero average field. The feedback current $i_f$ injected into the first and second pairs of sensing coils 16, 42 is directly proportional to the applied torque 11 applied to the shaft 12.

Ideally, because cores of the first and/or second pair of sensing coils 16, 42 operate at zero average field, there will not be any temperature-related effects of gain or offset on a torque signal. But, temperature-related effects of gain or offset are impossible when parameters of the first and/or second pair of sensing coils 16, 42 are ideally matched (especially, for example, when all active resistances are the same) and when the first and/or second pair of sensing coils 16, 42 have the same temperature (absence of temperature gradient). An initial mismatch of active resistances of the first and/or second pair of sensing coils 16, 42 and different drifts occur because of temperature changes of the first and/or second pair of sensing coils 16, 42. In turn, this leads to different equivalent voltages applied to the first and/or second pair of sensing coils 16, 42. A summation of voltages of the first and/or second pair of sensing coils 16, 42 at the common node 36 corresponding to voltage will contain a parasitic, and dependent on temperature and temperature gradient waveform. The summation of voltages of the first and/or second pair of sensing coils 16, 42 will also contain a periodic waveform containing even-order harmonics of a frequency of a signal from the oscillator 26. This is the source of torque measurement error.

The first and second resistors R1, R2, the scanning multiplexer 38, the common node 36, the temperature and temperature gradient detector 68, and the torque output signal compensator 70 detect a temperature, as described previously, of the first and second pairs of sensing coils 16, 42 by estimating an active resistance of the first and second sensing coils 16, 42 during torque measurement. As described above, voltage is digitized, through the analog-to-digital converter 64 and input to the second harmonic detector 66. Voltage, once digitized through the analog-to-digital converter 64, is also input into the temperature and temperature gradient detector 68. The temperature and temperature gradient detector 68 makes an estimation of active resistances of the first and second pairs of sensing coils 16, 42 to measure a temperature and temperature gradient of the first and/or second pair of sensing coils 16, 42.

Once digitized, voltage is divided into five discrete segments. For example, voltage may be divided into the first voltage V1, the second voltage V2, the third voltage V3, the fourth voltage V4, and the fifth voltage V5. The fifth voltage V5 is input into the second harmonic detector 66, whereas the first V1, second V2, third V3 and fourth voltage V4 are input into the temperature and temperature gradient detector 68. The active resistance estimation process is identical for both the first and second pairs of sensing coils 16, 42. Voltages V1, V3 and V5 are used for active resistance estimation of the first pair of sensing coils 16 and voltages V2, V4 and V5 are used for active resistance estimation of the second pair of sensing coils 42. These digitized voltages are discussed in more detail with reference to the other Figures.

Figure 7:
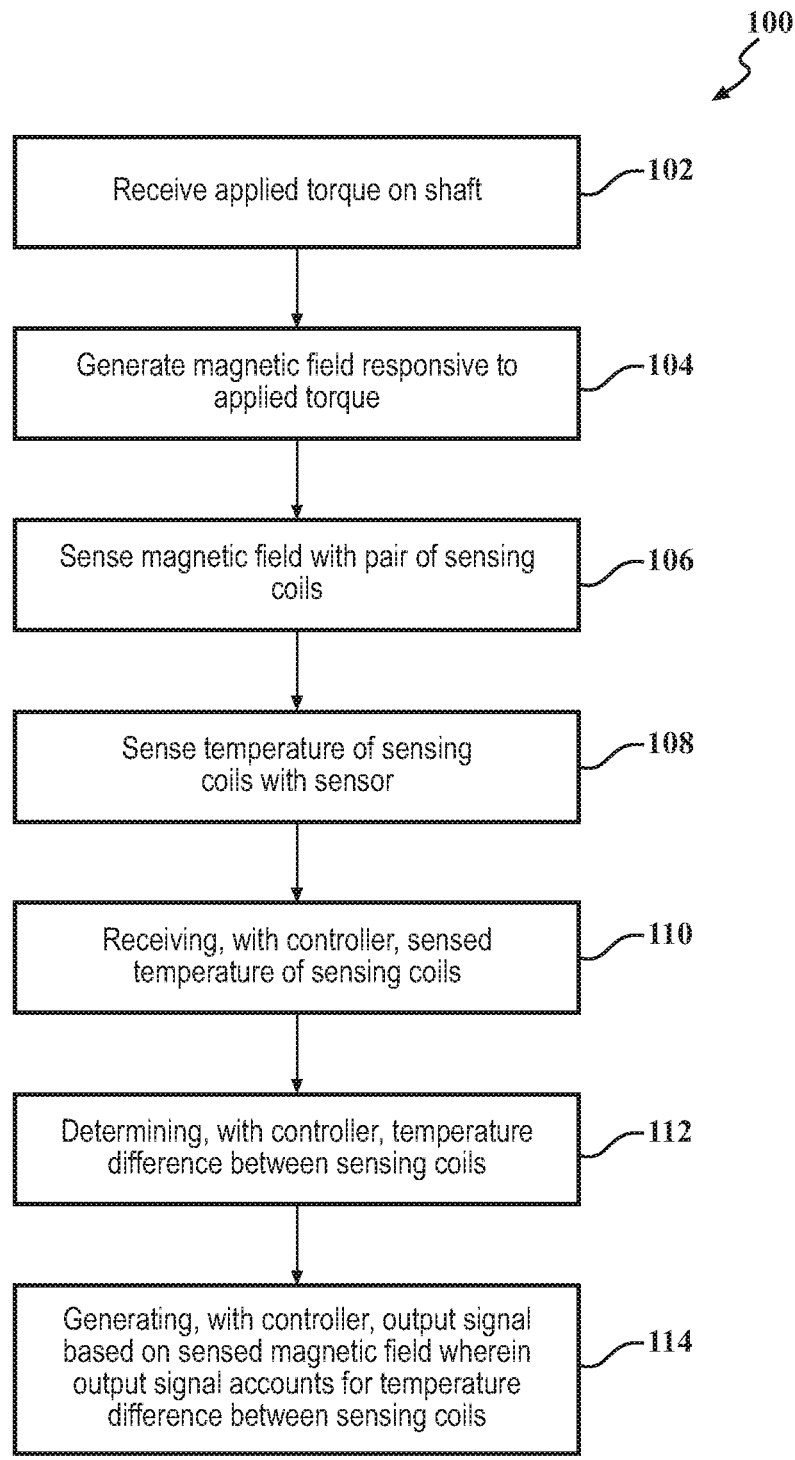
FIG. 7 depicts a flow diagram for operation of the torque sensor, according to one example.

Referring to FIG. 7, a method 100 of operating the torque sensor assembly 10 is shown. The method 100 according to FIG. 7 is configured to use the previously described components of the torque sensor assembly 10. At 102, the applied torque 11 is received on the shaft 12. When the applied torque 11 is received on the shaft 12, a magnetic field is generated, at 104. At 104, the magnetic field is generated responsive to the applied torque 11. The first and/or second pairs of sensing coils 16, 42 sense the magnetic field at 106. As described above, sensing the magnetic field at 106 with the first and/or second pairs of sensing coils 16, 42 induces current through the feedback and signal processing circuits 48, 50. At 108, the controller 72 uses the sensor 24 to sense a temperature of each sensing coil of the first and/or second pair of sensing coils 16, 42. The temperature and temperature gradient detector 68 is configured to receive the sensed temperature, through the sensor 24, of each sensing coil of the first and/or second pairs of sensing coils 16, 42 within the controller 72, in which the controller 72 forms all or part of the controller 72 at 110.

At 112, the controller 72 is also configured to determine a temperature difference between each sensing coil of the first and second pairs of sensing coils 16, 42 using the temperature and temperature gradient detector 68. Using the temperature difference between each of the sensing coils of the first and/or second pair of sensing coils 16, 42, the controller 72 generates an output signal from the torque output signal compensator 70 at 114. At 114, the controller 72 generates the output signal so that the output signal accounts for the temperature difference between each sensing coil of the first and second pairs of sensing coils 16, 42. Generating the output signal, through the controller 72 at 114, allows the torque sensor assembly 10 to adequately compensate for the temperature of the first and/or second pair of sensing coils 16, 42 during use to reduce thermal error in the torque sensor assembly 10. While described and shown as sequential, the steps of the method 100 may be used or performed in any order to adequately compensate for the temperature of the first and/or second pair of sensing coils 16, 42.

The controller 72 is configured to estimate an active resistance of the first pair of sensing coils 16 in response to the magnetic field sensed by the first pair of sensing coils 16. For example, as described in more detail below, a temperature difference between each sensing coil of the first and/or second pairs of sensing coils 16, 42 is further defined as a temperature gradient, and the controller 72 is configured to correlate the active resistance to the temperature gradient. The controller 72 may be further configured to access a look-up table stored in the memory to correlate the active resistance to the temperature gradient. The memory of the controller 72 may be an EPROM, EEPROM or any other memory suitable for temperature compensation of the torque sensor assembly 10.

Figure 8:
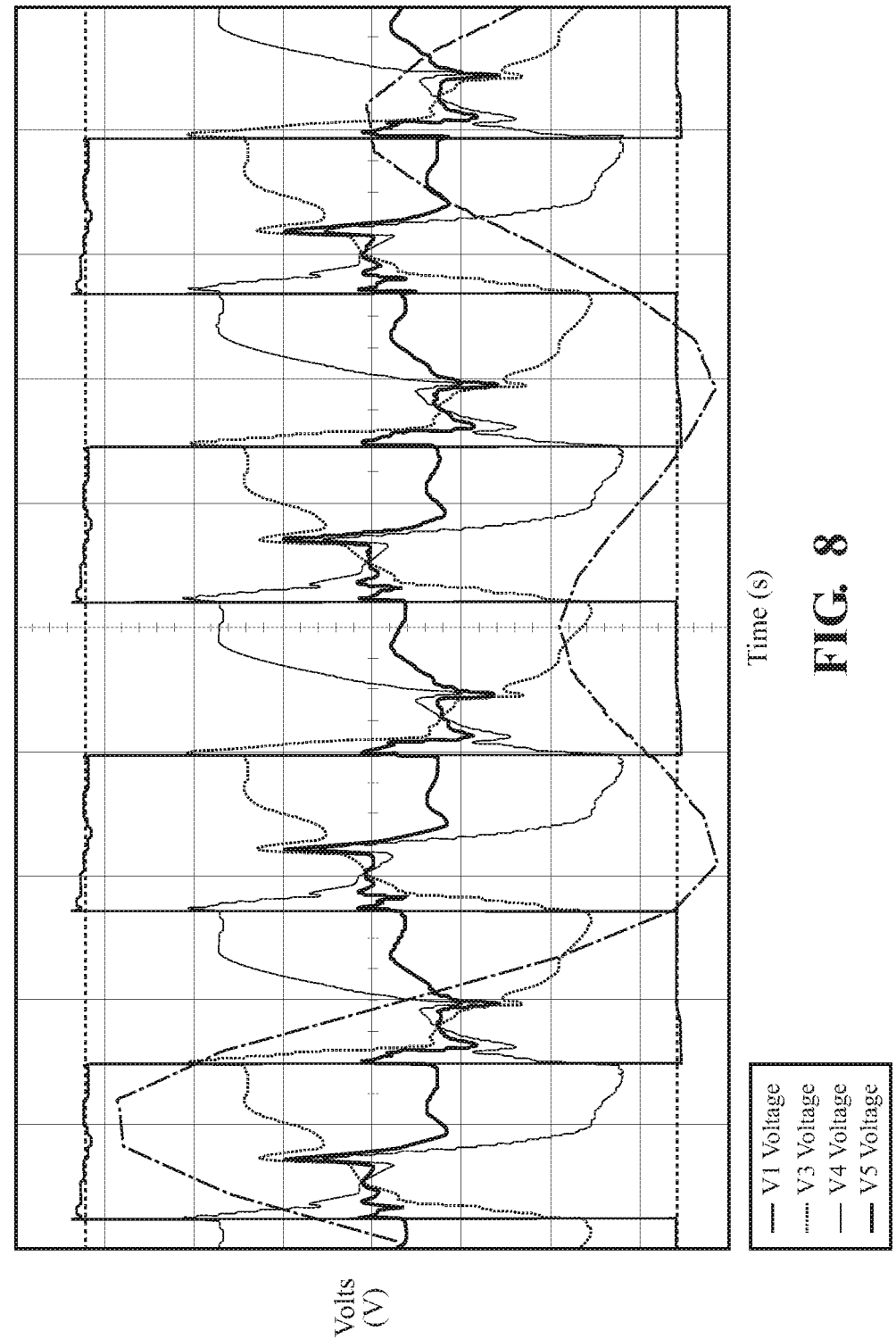
FIG. 8 depicts a chart of practical voltage waveforms generated by the torque sensor assembly.

Referring to FIG. 8, voltage waveforms generated by the torque sensor assembly 10 are depicted. In FIG. 8, voltage in volts is represented along the y-axis, and time in seconds is represented along the x-axis. As described above, voltage is digitized through the analog-to-digital converter 64 and divided into five discrete segments. Waveforms depicted in FIG. 8 depict the first voltage V1, the third voltage V3, the fourth voltage V4, and the fifth voltage V5. The second voltage V2 has been left off FIG. 8 for simplicity due to similarity to the first voltage V1. Additionally, FIG. 8 depicts first, second and third harmonics of the fifth voltage V5. As discussed above, the fifth voltage V5 is digitized by the analog-to-digital converter 64 and input to the second harmonic detector 66. The first, second, third and fourth voltages V1, V2, V3 and V4, once digitized by the analog-to-digital converter 64, are input to the temperature and temperature gradient detector 68.

The temperature and temperature gradient detector 68 estimates the active resistances of first and second pairs of sensing coils 16, 42. The active resistance estimation process through the temperature and temperature gradient detector 68 is identical for both the first and second pairs of sensing coils 16, 42. The first, third and fifth voltages V1, V3 and V5 are used for active resistance estimation of the first pair of sensing coils 16 and the second, fourth and fifth voltages V2, V4 and V5 are used for active resistance estimation of second pair of sensing coils 42. These digitized voltages are presented in FIGS. 9A and 9B below.

Figure 9A:
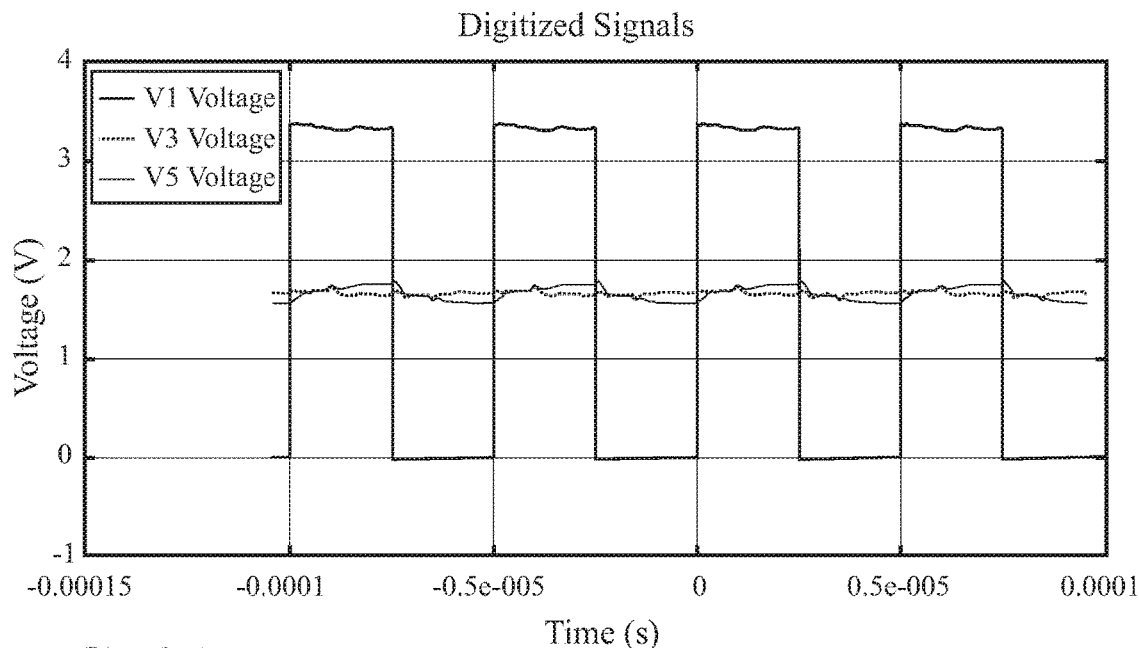
FIG. 9A depicts a chart of digitized voltages for resistance estimation of a left pair of sensing coils.
Figure 9B:
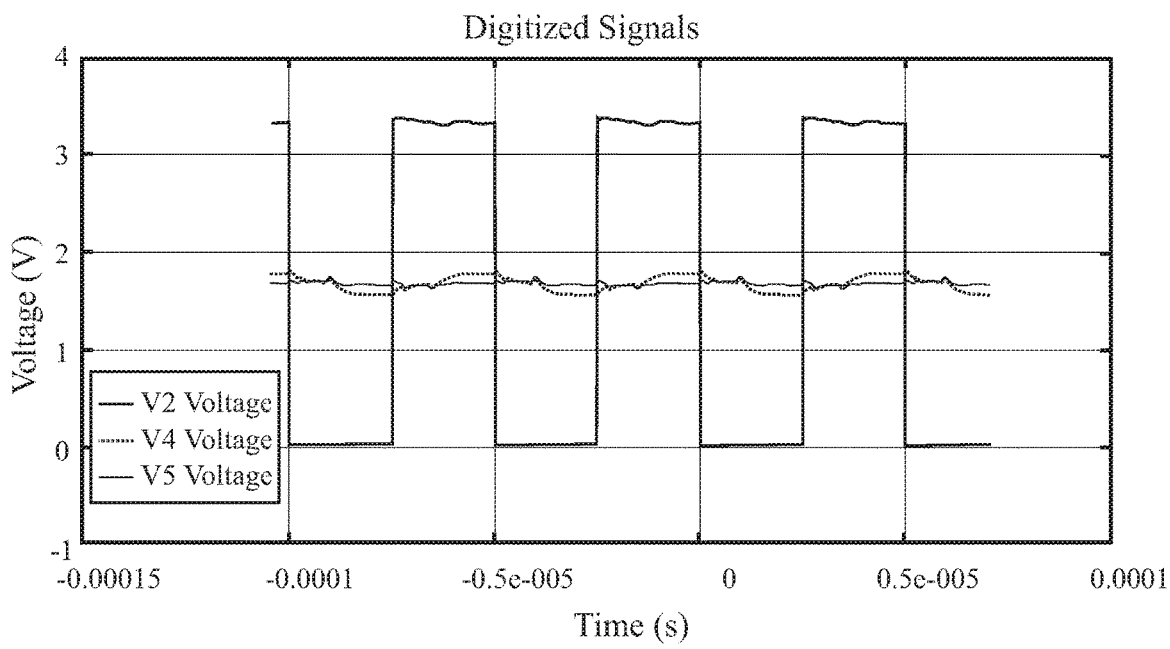
FIG. 9B depicts a chart of digitized voltages for a resistance estimation process of a right pair of sensing coils.

FIG. 9A depicts digitized voltage waveforms of the first, third and fifth voltages V1, V3 and V5 for active resistance estimation through the temperature and temperature gradient detector 68 for the first pair of sensing coils 16. In FIG. 9A, voltage in volts is represented along the y-axis, and time in seconds is represented along the x-axis. FIG. 9B depicts digitized voltage waveforms for the second, fourth and fifth voltages V2, V4 and V5 for active resistance estimation of second pair of sensing coils 42 through the temperature and temperature gradient detector 68. In FIG. 9B, voltage in volts is represented along the y-axis, and time in seconds is represented along the x-axis. The temperature and temperature gradient detector 68 defines the first, third and fifth voltages V1, V3 and V5 for the first pair of sensing coils 16 as:

$$V_{coils\_left} = V1 - V3;$$

$$I_{coils\_left} = (V3 - V5)/R1;$$

The temperature and temperature gradient detector 68 defines the second, fourth and fifth voltages V2, V4 and V5 for the second pair of sensing coils 42 as:

$$V_{coils\_right} = V2 - V4;$$

$$I_{coils\_right} = (V4 - V5)/R2;$$

In the equations above, $V_{coils\_left}$ and $V_{coils\_right}$ represent voltage drops on corresponding first and second pairs of sensing coils 16, 42. Additionally, in the equations above, $I_{coils\_left}$ and $I_{coils\_right}$ represent current through corresponding first and second pairs of sensing coils 16, 42.

Figure 10:
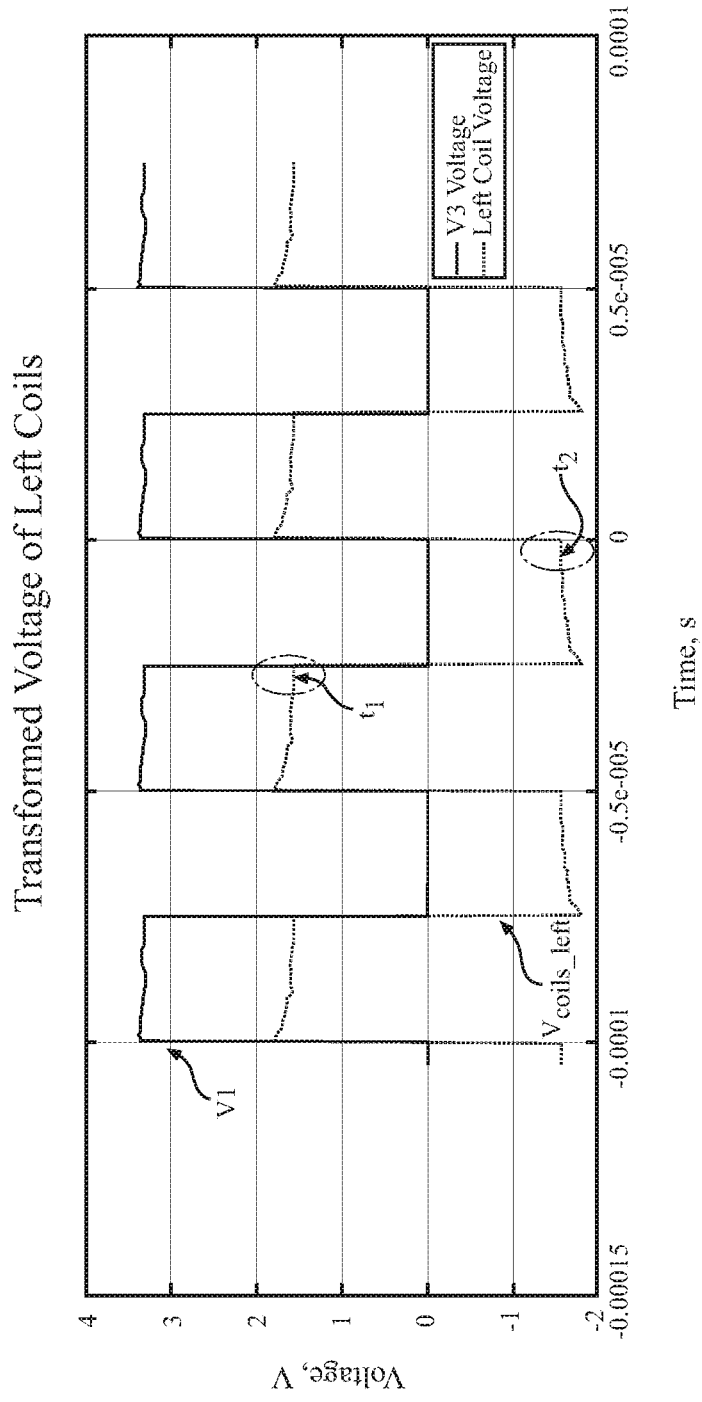
FIG. 10 depicts a chart of transformed voltages.
Figure 11:
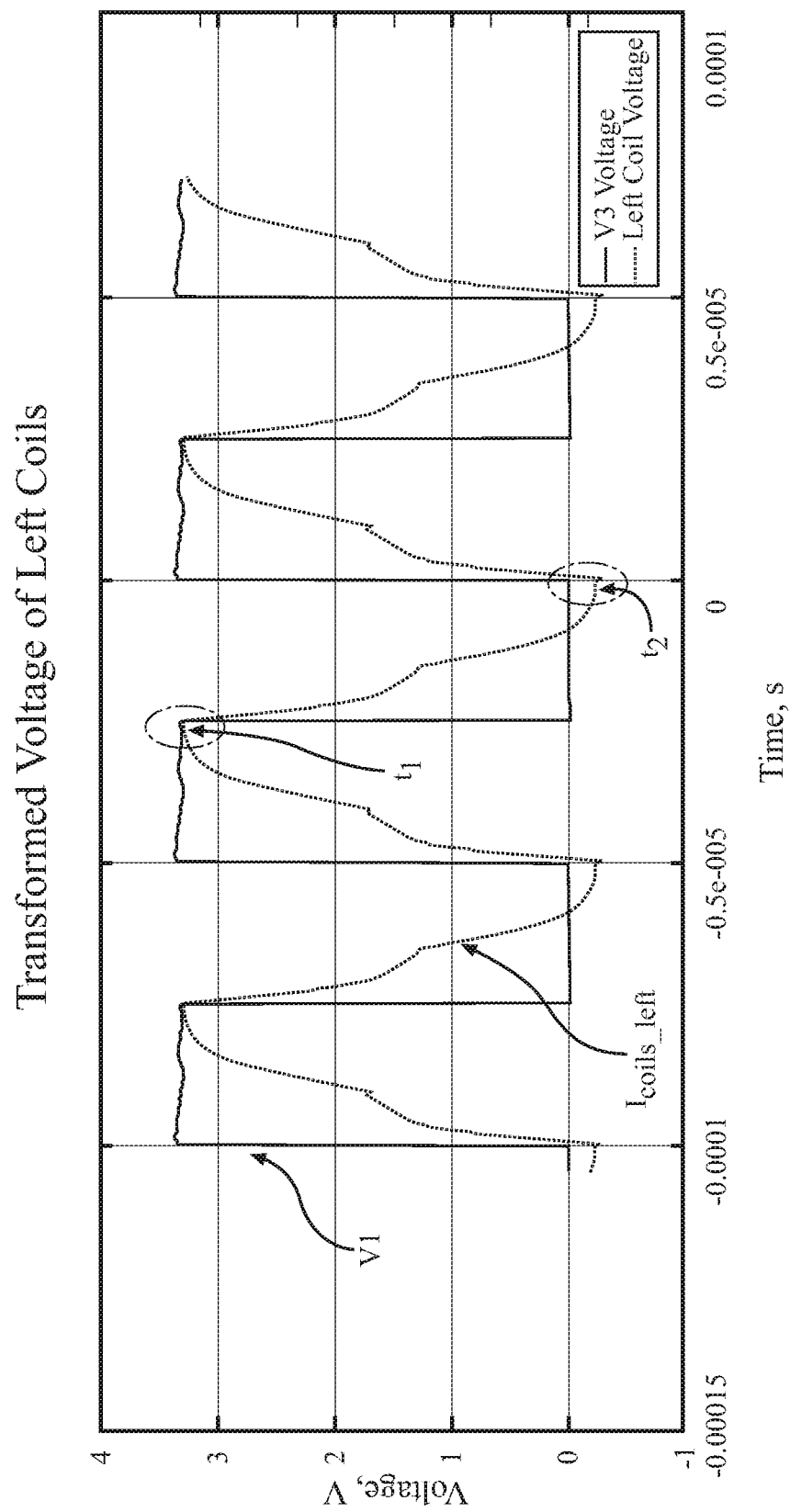
FIG. 11 depicts another chart of transformed voltages.

Referring to FIGS. 10 and 11, signals for transformed voltages are graphically depicted with voltage in volts is represented along the y-axis and time in seconds is represented along the x-axis. As shown in FIG. 10, cores of the first and second pairs of sensing coils 16, 42 are deeply saturated at ends of both halves of an excitation cycle. Inductance through the first and second pairs of sensing coils 16, 42 is very low due to the cores being deeply saturated at the ends of the excitation cycle. Therefore, since inductance also does not depend on temperature, inductance may be neglected. As shown in FIG. 11, current through the corresponding first and/or second pair of sensing coils 16, 42 is limited by the active resistance at times t1, t2 just before an excitation voltage toggle. The active resistances of the first and second pairs of sensing coils 16, 42 is estimated as:

$$R_{coils\_left} = abs\{[V_{coils\_left}(t_1) - V_{coils\_left}(t_2)]/[I_{coils\_left}(t_1) - I_{coils\_left}(t_2)]\};$$

$$R_{coils\_right} = abs\{[V_{coils\_right}(t_1) - V_{coils\_right}(t_2)]/[I_{coils\_right}(t_1) - I_{coils\_right}(t_2)]\};$$

A copper, coil wire defines a high and stable temperature coefficient for volume resistivity with very few variations. The estimation of the active resistance of the first and second pairs of sensing coils 16, 42 enables a detection of a corresponding temperature $T_{left}$, $T_{right}$ for each of the first and second pairs of sensing coils 16, 42, and a temperature gradient $\Delta T$ between the first and second pairs of sensing coils 16, 42.

The corresponding temperature and the temperature gradient $T_{left}$, $T_{right}$, $\Delta T$, as well as a ratio of the corresponding temperature $T_{left}/T_{right}$ for each of the first and second pairs of sensing coils 16, 42 with the resulting torque output signal from the second harmonic detector 66 serve as inputs to the torque output signal compensator 70. The torque output signal compensator 70 corrects a measured torque value according to a weighted linear correction function defined as:

Torque_output_signal=Torque*(1+$a_1$*$T_{left}$+$a_2$*$T_{right}$+$a_3$*$\Delta T$+$a_4$*$T_{left}/T_{right}$);

Alternatively, a polynomial function may be used by the torque output signal compensator 70 to correct a measured torque value. The polynomial function may also define a more precise output signal from the torque output signal compensator 70 compared with the simpler weighted linear correction function above. The polynomial function may be defined as:

Torque_output_signal=Torque*(1+$a_1$*$T_{left}$+$a_2$*$T_{right}$+$a_3$*$\Delta T$+$a_4$*$T_{left}/T_{right}$+$a_5$*$T^2_{left}$+$a_6$*$T^2_{right}$+$a_7$*$\Delta T^2$+ . . . );

Where, coefficients $\{a_i\}$ are weights of corresponding factors.

For example, approximately 1Ω of resistance difference may be detected, which corresponds to a temperature gradient $\Delta T$ of approximately 10° C. Resolution of resistance detection is approximately 0.1Ω, which leads to good resolution for temperature estimation by the temperature and temperature gradient detector 68. The torque output signal is corrected by the torque signal compensator 70 with the simplest linear correction by using the ratio of corresponding temperature $T_{left}/T_{right}$ for each of the first and second pairs of sensing coils 16, 42. A total temperature error of a measured torque was near zero. FIGS. 10 and 11 describe transformed voltages and current of the left pair of sensing coils 16. Similarly, the right pair of sensing coils 42 achieve a waveform consistent with those shown in FIGS. 10 and 11, and described above.

The above described magneto-elastic torque sensor assembly 10 with temperature dependent error compensation provides a multiplicity of advantages. For example, the above described magneto-elastic torque sensor assembly 10 provides an estimation of the temperature and temperature gradient for the first and second pairs of sensing coils 16, 42 without any influence to the measured torque. The magneto-elastic torque sensor assembly 10 with temperature dependent error compensation also provides a low cost and high precision torque sensor assembly 10 due to realization of most sensory blocks as software functions defined in the controller 72 according to the controller 72. A further advantage of the magneto-elastic torque sensor assembly 10 with temperature dependent error compensation is that the estimation of the temperature and the temperature gradient $T_{left}$, $T_{right}$, $\Delta T$ between each of the first and second pairs of sensing coils 16, 42 uses the same AC signal as the torque measurement process.

The advantages described above are due to the states of the magnetic cores of the first and second pairs of sensing coils 16, 42 being not affected by the temperature detection process. Further, the process of estimation of the temperature and the temperature gradient $T_{left}$, $T_{right}$, $\Delta T$ between each of the first and second pairs of sensing coils 16, 42 is based on the temperature coefficient for volume resistivity of coil copper wire, which is high, stable and has very few variations. Lastly, the process of estimation of the temperature and the temperature gradient $T_{left}$, $T_{right}$, $\Delta T$ between each of the first and second sensing coils 16, 42 is based on peak-to-peak values of voltages, which leads to low noise influence on the estimation of the coils' active resistance.

Several instances have been described in the foregoing description. However, the instances discussed herein are not intended to be exhaustive or limit the invention to any particular form. The terminology, which has been used, is intended to be in the nature of words of description rather than of limitation. Many modifications and variations are possible in light of the above teachings and the invention may be practiced otherwise than as specifically described.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A torque sensor assembly comprising:
    a shaft configured to receive an applied torque and comprising at least one region being magneto-elastic and being configured to generate a magnetic field dependent on the applied torque;
    a first pair of sensing coils disposed adjacent to the at least one region and being configured to sense the magnetic field;
    a sensor configured to sense a temperature of each of the sensing coils; and
    a controller coupled to the first pair of sensing coils and the sensor and being configured to:
        receive the sensed temperature of each of the sensing coils;
        determine a temperature difference between the sensing coils; and
        generate an output signal based on the sensed magnetic field wherein the output signal accounts for the temperature difference between the sensing coils.

2. The torque sensor assembly of claim 1, wherein the at least one region includes a first magneto-elastic region and a second magneto-elastic region, wherein the first magneto-elastic region is configured to generate a first magnetic field dependent on the applied torque and the second magneto-elastic region is configured to generate a second magnetic field dependent on the applied torque, the first and second magnetic fields having opposing directions.

3. The torque sensor assembly of claim 2 further comprising a second pair of sensing coils, wherein one pair of sensing coils is disposed adjacent to the first magneto-elastic region and the other pair of sensing coils are disposed adjacent to the second magneto-elastic region.

4. The torque sensor assembly of claim 1 further comprising first and second resistors connected to an output of each sensing coil, wherein the sensing coils induce an electrical current responsive to sensing the magnetic field, and the electrical current is passed through each of the first and second resistors, wherein the sensor is further configured to sense the temperature of each sensing coil by measuring a voltage across each of the first and second resistors.

5. The torque sensor assembly of claim 1, wherein the controller further comprises:
    an oscillator configured to provide signals to the first pair of sensing coils; and a multiplexer configured to receive the sensed temperature of each of the sensing coils.

6. The torque sensor assembly of claim 1, wherein the controller is configured to estimate an active resistance of the first pair of sensing coils in response to the magnetic field sensed by the first pair of sensing coils.

7. The torque sensor assembly of claim 6, wherein the temperature difference is further defined as a temperature gradient and wherein the controller is configured to correlate the active resistance to the temperature gradient.

8. The torque sensor assembly of claim 7, wherein the controller is further configured to access a look-up table stored in a memory to correlate the active resistance to the temperature gradient.

9. The torque sensor assembly of claim 1, wherein the first pair of sensing coils generate a signal in response to sensing the magnetic field, and wherein the controller is further configured to detect a second harmonic component of the signal.

10. The torque sensor assembly of claim 9 further comprising a feedback circuit coupled to the first pair of sensing coils, and wherein the feedback circuit generates a feedback current based on the detected second harmonic component of the signal, and wherein the feedback circuit injects the feedback current into the first pair of sensing coils such that the sensing coils operate at zero average field.

11. The torque sensor assembly of claim 10, wherein the feedback current is directly proportional to the applied torque.

12. The torque sensor assembly of claim 1, wherein receiving the sensed temperature of each of the sensing coils and determining the temperature difference between the sensing coils occur without influencing sensing of the magnetic field by the first pair of sensing coils.

13. A method of operating a torque sensor assembly, the torque sensor assembly comprising a shaft configured to receive an applied torque and comprising at least one region being magneto-elastic and being configured to generate a magnetic field dependent on the applied torque, a pair of sensing coils disposed adjacent to the at least one region and being configured to sense the magnetic field, a sensor configured to sense a temperature of each of the sensing coils, and a controller coupled to the pair of sensing coils and the sensor, the method comprising:
  receiving, with the controller, the sensed temperature of each of the sensing coils;
  determining, with the controller, a temperature difference between the sensing coils; and
  generating, with the controller, an output signal based on the sensed magnetic field wherein the output signal accounts for the temperature difference between the sensing coils.

14. The method of claim 13 wherein the temperature difference is further defined as a temperature gradient, and further comprising correlating, with the controller, an active resistance of the pair of sensing coils to the temperature gradient.

15. The method of claim 14, wherein correlating the active resistance of the pair of sensing coils to the temperature gradient further comprises the controller utilizing a look-up table stored in a memory of the controller.

16. The method of claim 13, wherein receiving the sensed temperature of each of the sensing coils and determining the temperature difference between the sensing coils occur without influencing sensing of the magnetic field by the pair of sensing coils.

17. The method of claim 13 further comprising the pair of sensing coils generating a signal in response to sensing the magnetic field and the controller detecting a second harmonic component of the signal.

18. The method of claim 17, wherein a feedback circuit is coupled to the pair of sensing coils, and further comprising the feedback circuit:
  generating a feedback current based on the detected second harmonic component of the signal; and
  injecting the feedback current into the pair of sensing coils such that the sensing coils operate at zero average field.

19. A vehicular electronic power steering system comprising:
  a vehicular component configured to provide an applied torque; and
  a torque sensor assembly configured to be coupled with the vehicular component, the torque sensor assembly comprising:
    a shaft configured to receive the applied torque and comprising at least one region being magneto-elastic and being configured to generate a magnetic field dependent on the applied torque;
    a pair of sensing coils disposed adjacent to the at least one region and being configured to sense the magnetic field;
    a sensor configured to sense a temperature of each of the sensing coils; and
    a controller coupled to the pair of sensing coils and the sensor and being configured to:
      receive the sensed temperature of each of the sensing coils;
      determine a temperature difference between the sensing coils; and
      generate an output signal based on the sensed magnetic field wherein the output signal accounts for the temperature difference between the sensing coils.

* * * * *